US006610975B2

United States Patent
Ito et al.

(10) Patent No.: US 6,610,975 B2
(45) Date of Patent: Aug. 26, 2003

(54) OPTICAL ENCODER

(75) Inventors: Yoshinori Ito, Nagano-ken (JP); Kazuhiro Hane, Miyagi-ken (JP)

(73) Assignee: Harmonic Drive Systems, Inc., Tokyo (JP)

( * ) Notice: Subject to any disclaimer, the term of this patent is extended or adjusted under 35 U.S.C. 154(b) by 90 days.

(21) Appl. No.: 10/002,632

(22) Filed: Dec. 5, 2001

(65) Prior Publication Data

US 2002/0074487 A1 Jun. 20, 2002

(30) Foreign Application Priority Data

| Dec. 7, 2000 | (JP) | P-2000-372597 |
| Mar. 27, 2001 | (JP) | P-2001-089232 |
| Mar. 27, 2001 | (JP) | P-2001-089231 |

(51) Int. Cl.[7] .............................................. G01D 5/34
(52) U.S. Cl. .......................... 250/231.16; 250/237 G; 356/27
(58) Field of Search .................. 250/231.16, 231.15, 250/237 G, 237 R, 559.37; 341/13; 356/27, 28, 28.5, 616, 617

(56) References Cited

U.S. PATENT DOCUMENTS 5,155,355 A * 10/1992 Kabaya ................. 250/237 G

FOREIGN PATENT DOCUMENTS

JP 06-118088 4/1994

OTHER PUBLICATIONS

R.M. Pettigrew—Analysis of Grating Imaging and its Application to Displacement Metrology, SPIE vol. 136 1st European Congress on Optics Applied to Metrology (1977), pp. 325–332 (Month unknown).

* cited by examiner

Primary Examiner—Que T. Le
(74) Attorney, Agent, or Firm—Burns, Doane, Swecker & Mathis, L.L.P.

(57) ABSTRACT

In an optical linear encoder, light from an LED 2 passes through a moving grating 31 formed in a semiconductor moving plate 3 and is reflected by a reflective grating 41 of a reflective grating plate 4. An image of the reflective grating is detected by photodiodes 32 that are formed in the shape of a grid on the semiconductor moving plate 3. The moving grating 31 and the photodiodes 32 are formed on the same semiconductor substrate with the photodiodes 32 in the form of a grid having a lens effect. Consequently, a lens optical system is not required, making it possible to produce a compact, small-scale encoder. A differential signal for an A-phase signal obtained from a group of photodiodes arranged on the semiconductor substrate and an inverse of this signal is produced as the A-phase signal, and a differential signal for a B-phase signal and an inverse of this signal is produced as the B-phase signal, so that an encoder output with little error can be obtained.

23 Claims, 12 Drawing Sheets

FIG.1
(a)
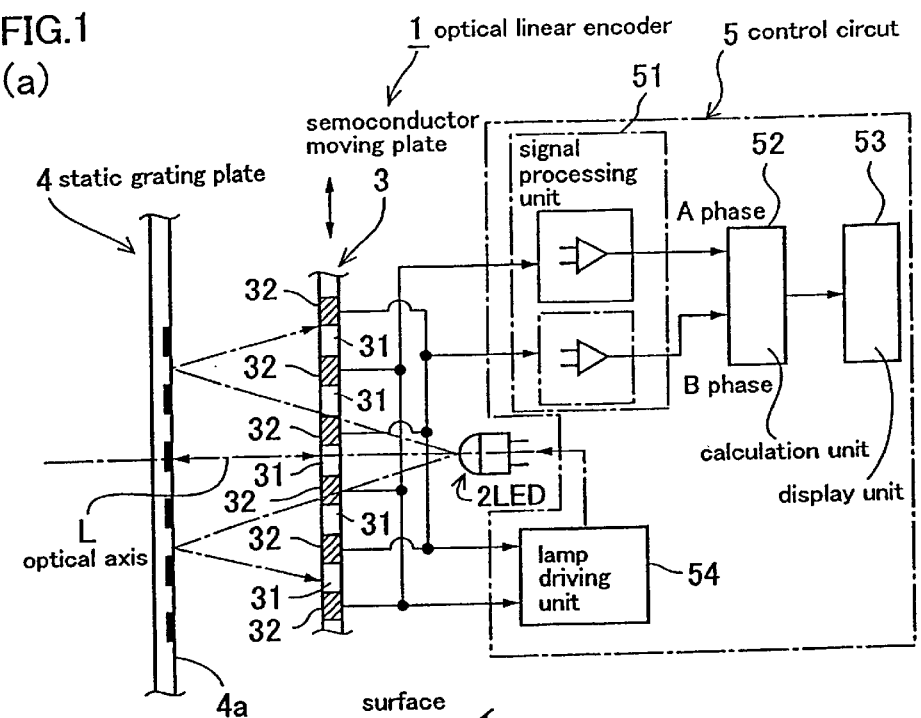
(b)
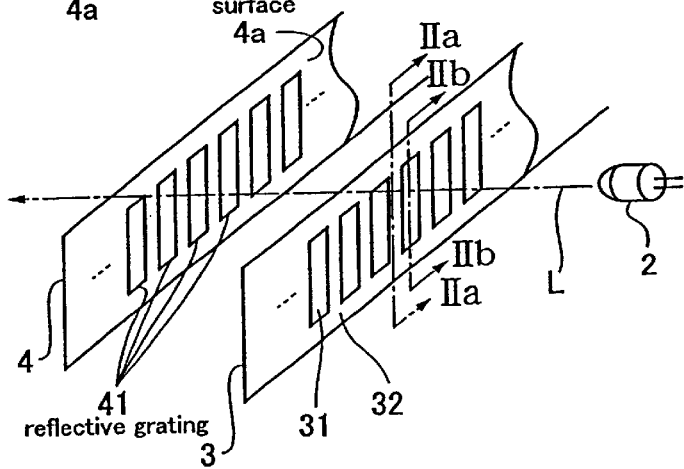
(c)
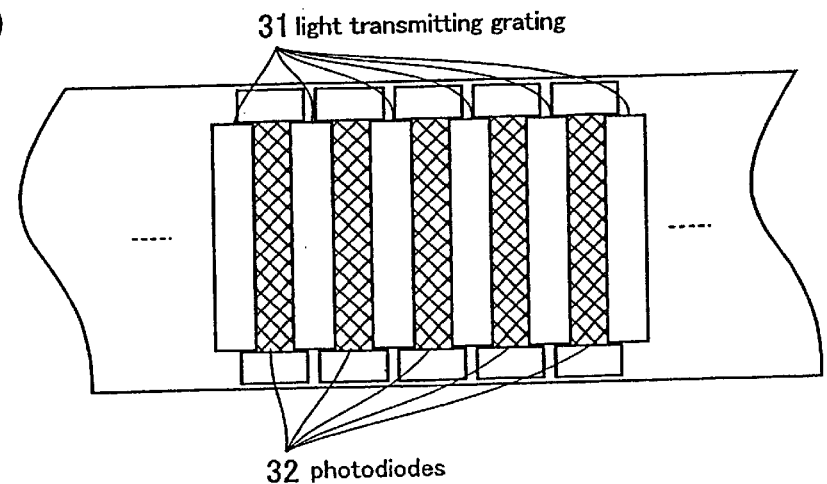

FIG.8
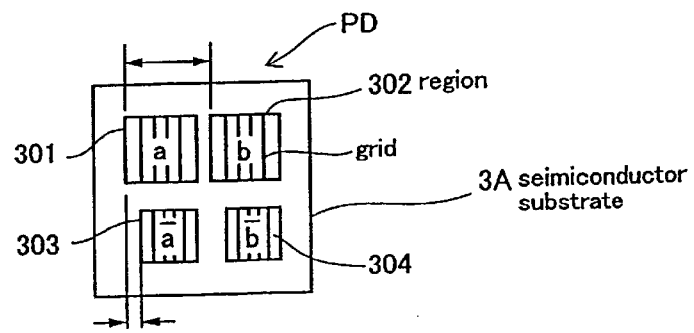
(a)
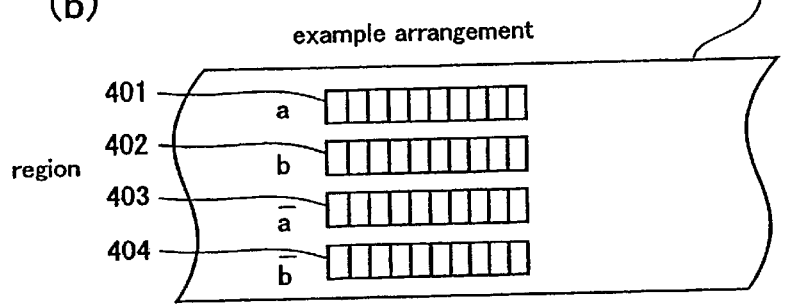
(b)
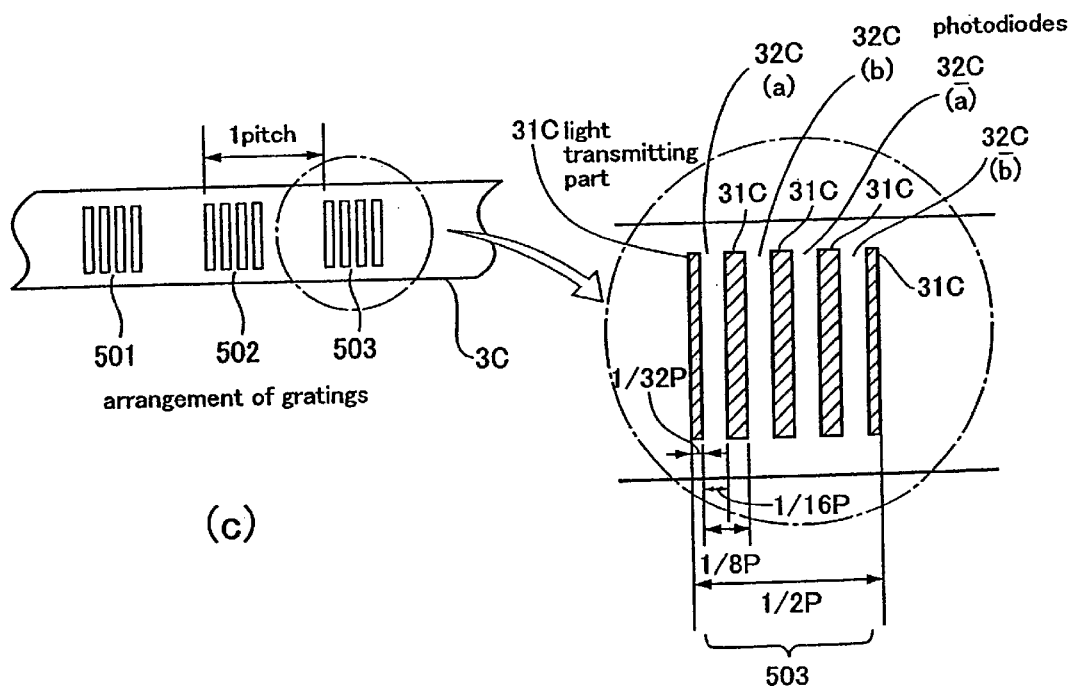
(c)
(d)

FIG.9
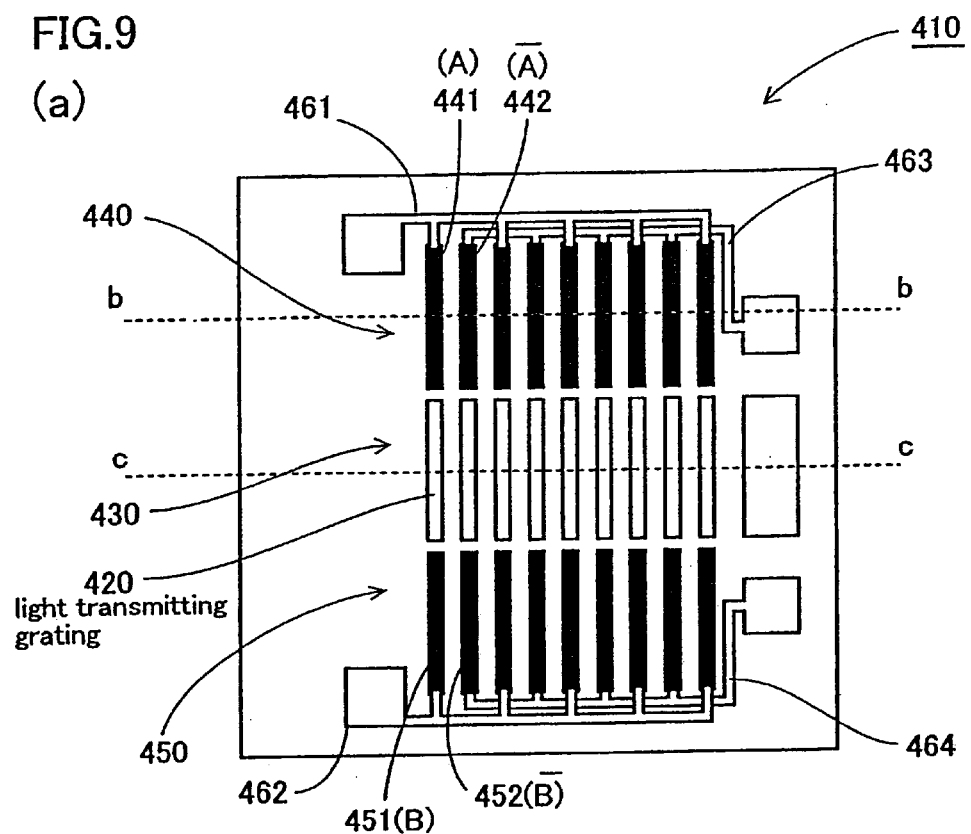
(a)
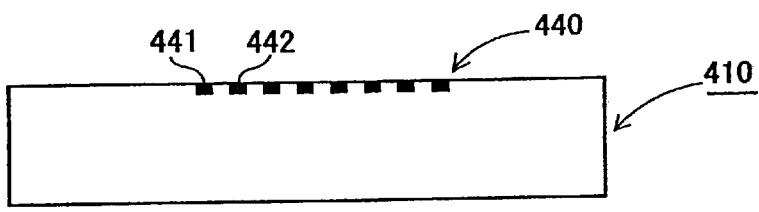
(b) (Cross-section b-b)
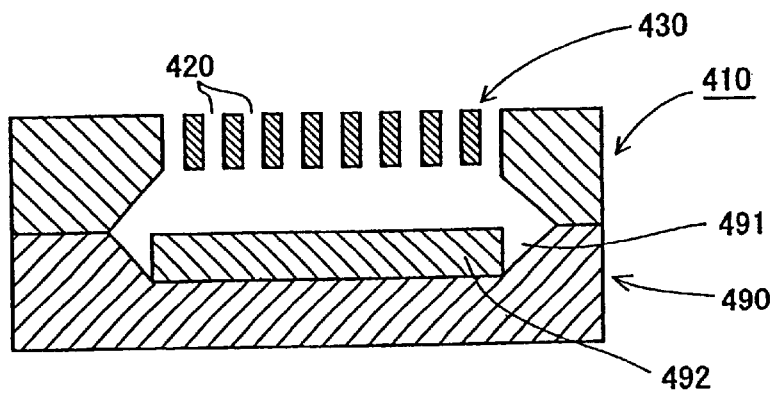
(c) (Cross-section c-c)

FIG.11 (a)
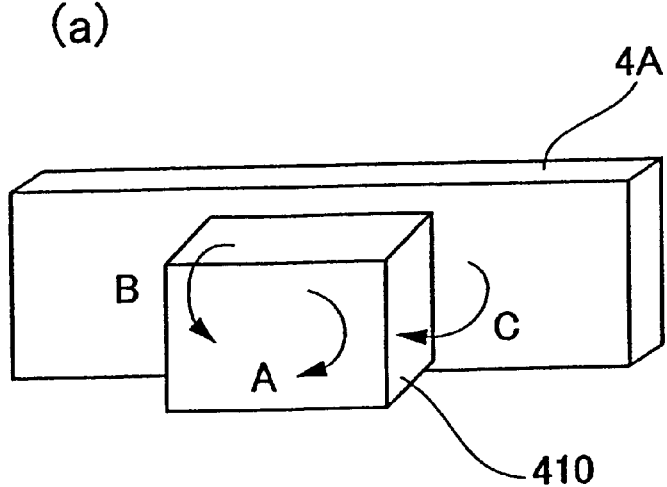
(b)
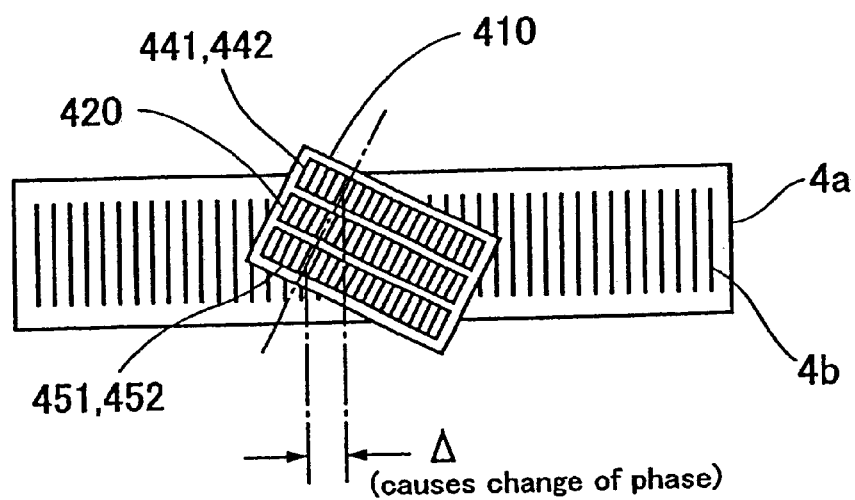

OPTICAL ENCODER

BACKGROUND OF THE INVENTION

1. Field of the Invention

The present invention relates to an optical encoder that can be compactly produced as a small device and can detect the position etc. of a moving body with high accuracy.

2. Prior Art Description

A detection apparatus for detecting the rotation or distance moved by a moving body is normally called a rotary encoder or a linear encoder. In most cases, a construction is used where a moving grating plate and a static grating plate are arranged between a light source and photodetectors. The amount of movement of a moving body, with which the moving grating plate is integrally provided, is detected based on changes in the amount of light from the light source that passes through the moving grating and static grating formed by these grating plates.

The resolving power of an optical encoder with the above construction is determined by the pitch of the gratings, so that the pitch of the gratings should be reduced in order to produce a encoder with high resolving power. However, in order to reduce the pitch of the gratings, the gap between the moving grating plate and the static grating plate needs to be reduced to prevent a drop in the signal to noise ratio (S/N ratio) due to the loss of light. Furthermore, the S/N ratio also falls if a reduction cannot be made in the fluctuation in the gap between the grating plates due to the movement of the moving grating.

Since there are limits on how narrow the gap between the grating plates can be made and on the extent to which fluctuation in the gap can be suppressed, one effective way of avoiding reductions in the S/N ratio due to the loss of light and fluctuation in the gap is to use a parallel light beam. A divergent light beam can be converted into a parallel light beam using a lens optical system, such as a collimating lens, and optical encoders that use such an optical system are conventionally known. However, the most commonly used light source for an optical encoder is a light-emitting diode (LED), and since LEDs are not point light sources, it is difficult to produce a high-quality parallel light beam. As a further problem, the addition of a lens optical system results in a corresponding increase in the dimensions of an optical encoder apparatus.

On the other hand, there is a conventional method for producing an optical encoder with high resolving power that uses the diffracting property of light. In an encoder that uses this method, light is produced by a point light source, such as a semiconductor laser, and is converted into a parallel light beam using lenses. This kind of encoder detects the movement of a moving body based on the changes in the amount of light received by photodetectors due to the diffraction and interference that occur when the parallel light beam passes through a grating with extremely fine pitch. When this method is used, the pitch of the gratings can be made finer than in an encoder of the construction described earlier, and the distribution of light due to interference approximates to a sine wave, so that the electrical signal can be precisely divided. However, both the gratings and the apparatus construction have to be produced with high precision, making such apparatuses expensive. A further problem is the poor reliability of the semiconductor laser used as the light source.

Another example of an optical encoder has been proposed by the applicant of the present specification in Japanese Laid-Open Patent Application H06-118088. This optical encoder is a spatial filter encoder where an image of the moving grating passes through lenses and is formed on an array of photodetectors that are arranged in a grid. With this method, the high-frequency components of the signal produced by the movement of the grating are removed due to the filter effect, so that a signal that approximates to a sine wave can be obtained. Accordingly, by using a signal divider, a high resolving power can be achieved. However, when the pitch of the gratings is reduced, it is difficult to raise the contrast of the image formed on the photodetectors. Also, since a lens optical system is used, there is the further problem of an increase in the dimensions of the apparatus.

"Analysis of Grating Imaging and its Application to Displacement Metrology" SPIE Vol. 136 $1^{st}$ European Congress on Optics Applied to Metrology (1977), pp. 325–332 describes a triple-grating theory and its application in the measurement of displacement. As disclosed in the above article, an index grating plate and a reflective grating plate are arranged in facing positions, with the light source and photodetectors being provided behind the index grating plate. Light from the light source is shone at the index grating plate, and the light that passes an index grating in the index grating plate is reflected back off a reflective grating on the reflective grating plate and passes back through the index grating in the index grating plate to the photodetectors, so that the movement of the reflective grating can be detected.

With the above construction, the gap between the index grating plate and the reflective grating plate can be large without affecting the contrast, with fluctuations in the gap between the gratings also having little effect on the contrast.

Consequently, by using the triple-grating theory where a reflective grating is used, it is possible to produce an optical encoder with high resolving power that is unaffected by the width of the gap between the static grating and the moving grating and by fluctuations in this gap.

However, the following problems remain to be solved when adopting this method in an optical encoder.

First, with an encoder of the construction described above, it is necessary to arrange the light source and photodetectors behind the index grating, which makes the construction complicated and leads to poor efficiency for the detection of light. Also, to use this kind of device as an encoder, it is necessary to use at least two photodetectors and to obtain signals that have a phase difference of one-quarter wavelength to detect the direction in which the moving body is moving. However, it is actually very difficult to produce a construction where the light source and at least two photodetectors are arranged behind the index grating and signals with a phase difference of one-quarter wavelength are obtained from the photodetectors.

Also, since the cost of an encoder with the above construction is directly linked to the size of the photodetectors, it is desirable to make these components extremely small. In order to raise the efficiency with which the emitted light is received by the photodetectors, it is also desirable to provide the photodetectors as close as possible to the light source.

In view of the above, by setting the emission point of an LED that is commonly used as a light source at a position that is close to a light transmitting grating and raising the divergence angle of the LED, an increase can be made in the area of the photodetectors that receives reflected light. However, due to the dimensions of the lens for the LED and other factors, there is no realistic way to raise the divergence angle of the LED. If the photodetectors are brought close to the light source without the divergence angle of the LED being increased, this leads to the undesirable result of a large decrease in the effective light-receiving area of the photodetectors for reflected light.

In view of the problems stated above, it is an object of the present invention to provide, based on the triple-grating theory where a reflective grating is used, a compact, small-scale optical encoder that can detect both the speed of movement and direction of movement (moved-to position) of a moving body.

SUMMARY OF THE INVENTION

In order to achieve the stated object, the present invention is an optical encoder, including a light source, a reflective grating of a predetermined form and a fixed pitch, a light transmitting grating of a predetermined form and a fixed pitch, and photodetectors with light receiving surfaces of predetermined form and a predetermined pitch that receive a reflected image produced by light from the light source that has passed through the light transmitting grating and been reflected by the reflective grating, the optical encoder detecting at least a speed of relative movement of the reflective grating and the light transmitting grating, based on detection signals produced by the photodetectors, the optical encoder including:

a reflective grating plate in which the reflective grating is formed; and a semiconductor substrate in which the light transmitting grating and the photodetectors are formed, the light transmitting grating being one of slits for transmitting light that are formed in the semiconductor substrate and thin-film parts for transmitting light that are formed in the semiconductor substrate, a first region, in which the photodetectors and parts of the light transmitting grating are alternately arranged, and a second region, in which the photodetectors and parts of the light transmitting grating are alternately arranged, being formed in the semiconductor substrate, and a detection signal obtained from the photodetectors in the first region having a phase difference of 90° with a detection signal obtained from the photodetectors in the second region.

Here, a third region, in which the photodetectors and parts of the light transmitting grating are alternately arranged, and a fourth region, in which the photodetectors and parts of the light transmitting grating are alternately arranged, may also be formed in the semiconductor substrate. In this case, the photodetectors may be arranged so that a detection signal obtained from the photodetectors in the third region has a phase difference of 180° with a detection signal obtained from the photodetectors in the first region, and a detection signal obtained from the photodetectors in the fourth region has a phase difference of 180° with a detection signal obtained from the photodetectors in the second region.

With the stated construction, an A-phase signal is obtained from the photodetectors in the first region, a B-phase signal is obtained from the photodetectors in the second region, an inverse A-phase signal is obtained from the photodetectors in the third region, and an inverse B-phase signal is obtained from the photodetectors in the fourth region. Based on these signals, encoder signals with little error can be generated.

Another aspect of the present invention is an optical encoder, including a light source, a reflective grating of a predetermined form and a fixed pitch, a light transmitting grating of a predetermined form and a fixed pitch, and photodetectors with light receiving surfaces of predetermined form and a predetermined pitch that receive a reflected image produced by light from the light source that has passed through the light transmitting grating and been reflected by the reflective grating, the optical encoder detecting at least a speed of relative movement of the reflective grating and the light transmitting grating, based on detection signals produced by the photodetectors, the optical encoder including:

a reflective grating plate in which the reflective grating is formed; and a semiconductor substrate in which the light transmitting grating and the photodetectors are formed with parts of the light transmitting grating and the photodetectors in alternating positions, the light transmitting grating being one of slits for transmitting light that are formed in the semiconductor substrate and thin-film parts for transmitting light that are formed in the semiconductor substrate, and a detection signal obtained from a first group of photodetectors, out of the photodetectors formed in the semiconductor substrate, having a phase difference of 90° with a detection signal obtained from a second group of photodetectors, out of the photodetectors formed in the semiconductor substrate.

Here, a first region, in which the photodetectors and parts of the light transmitting grating are alternately arranged at fixed intervals, and a second region, in which the photodetectors and parts of the light transmitting grating may be alternately arranged at the same fixed intervals as in the first region, are formed in the semiconductor substrate. In this case, it is preferable for the photodetectors to be arranged so that a detection signal obtained from photodetectors that are in the first group of photodetectors and are located in the first region has a phase difference of 180° with a detection signal obtained from photodetectors that are in the first group of photodetectors and are located in the second region, and a detection signal obtained from photodetectors that are in the second group of photodetectors and are located in the first region has a phase difference of 180° with a detection signal obtained from photodetectors that are in the second group of photodetectors and are located in the second region.

Another aspect of the present invention is an optical encoder, including a light source, a reflective grating of a predetermined form and a fixed pitch, a light transmitting grating of a predetermined form and a fixed pitch, and photodetectors with light receiving surfaces of predetermined form and a predetermined pitch that receive a reflected image produced by light from the light source that has passed through the light transmitting grating and been reflected by the reflective grating, the optical encoder detecting at least a speed of relative movement of the reflective grating and the light transmitting grating, based on detection signals produced by the photodetectors, the optical encoder including:

a reflective grating plate in which the reflective grating is formed; and a semiconductor substrate in which the light transmitting grating and the photodetectors are formed, the light transmitting grating being one of slits for transmitting light that are formed in the semiconductor substrate and thin-film parts for transmitting light that are formed in the semiconductor substrate, a first region, in which the photodetectors arranged at predetermined intervals, and a second region, in which parts of the light transmitting grating are arranged at predetermined intervals, being formed in the semiconductor substrate, and a detection signal obtained from a first group of photodetectors that are located at odd-numbered positions in the first region having a phase difference of 180° with a detection signal obtained from a second group of photodetectors that are located at even-numbered positions in the first region.

Here, it is preferable for a third region in which the photodetectors arranged at predetermined intervals to be formed in the semiconductor substrate, with a detection signal obtained from a third group of photodetectors that are located at odd-numbered positions in the third region having a phase difference of 180° with a detection signal obtained from a fourth group of photodetectors that are located at even-numbered positions in the third region, and the detection signal obtained from a first group of photodetectors having a phase difference of 90° with a detection signal obtained from the third group of photodetectors.

Another aspect of the present invention is an optical encoder, including a light source, a reflective grating of a predetermined form and a fixed pitch, a light transmitting grating of a predetermined form and a fixed pitch, and photodetectors with light receiving surfaces of predetermined form and a predetermined pitch that receive a reflected image produced by light from the light source that has passed through the light transmitting grating and been reflected by the reflective grating, the optical encoder detecting at least a speed of relative movement of the reflective grating and the light transmitting grating, based on detection signals produced by the photodetectors, the optical encoder including:

a reflective grating plate in which the reflective grating is formed; and a semiconductor substrate in which the light transmitting grating and the photodetectors are formed, the light transmitting grating being one of slits for transmitting light that are formed in the semiconductor substrate and thin-film parts for transmitting light that are formed in the semiconductor substrate, a first region, in which the photodetectors are arranged at predetermined intervals, a second region, in which the photodetectors are arranged at predetermined intervals, and a third region, in which parts of the light transmitting grating are arranged at predetermined intervals, being formed in the semiconductor substrate, and detection signals obtained from adjacent photodetectors in the first region and the second region having a phase difference of 270°.

Here, it is preferable for the optical encoder of the present invention to include a signal processing circuit for generating differential signals from the detection signals that have a phase difference of 180°. By doing so, encoder signals with little error can be generated based on the differential signals.

At the same time, it is preferable for the optical encoder of the present invention to include at least one planar LED as the light source.

In this case, it is preferable for the optical encoder to include at least a first planar LED and a second planar LED as the light source, with the first planar LED facing the first region and the second planar LED facing the second region.

When planar LEDs are used as the light source, a wide effective light-receiving area can be achieved for the photodetectors even if the gap between the planar diodes and the reflective grating is narrow. Also, since the planar LEDs are attached by bonding them to a rear surface of the moving grating, an increase can be made in the amount of reflected light received by the photodetectors. As a result, the S/N ratio can be increased and an extremely slim optical encoder can be produced.

Another aspect of the present invention is an optical encoder, including a light source, a reflective grating of a predetermined form and a fixed pitch, a light transmitting grating of a predetermined form and a fixed pitch, and photodetectors with light receiving surfaces of predetermined form and a predetermined pitch that receive a reflected image produced by light from the light source that has passed through the light transmitting grating and been reflected by the reflective grating, the optical encoder detecting at least a speed of relative movement of the reflective grating and the light transmitting grating, based on detection signals produced by the photodetectors, the optical encoder including:

at least one planar LED as a light source; a reflective grating plate in which the reflective grating is formed; and a semiconductor substrate in which the light transmitting grating and the photodetectors are formed, the light transmitting grating being one of slits for transmitting light that are formed in the semiconductor substrate and thin-film parts for transmitting light that are formed in the semiconductor substrate.

Here, it is preferable for the optical encoder to include a support substrate for supporting the at least one planar diode, at least one concave being formed in the support substrate and the at least one planar LED being attached to the at least one concave. It is also possible for the at least one planar LED to be composed of more than one planar LED.

BRIEF DESCRIPTION OF THE DRAWINGS

FIGS. 1(a) to 1(c) show the construction of an optical linear encoder that relates to the present invention;

FIGS. 8(a) to 8(d) show three example arrangements of regions composed of a light transmitting grating and photodiodes;

FIGS. 9(a) to 9(c) show an example arrangement of the light transmitting grating and photodiodes formed in the surface of a semiconductor substrate, with FIG. 9(a) being an overhead view, FIG. 9(b) being a cross-sectional view, and FIG. 9(c) being another cross-sectional view in which certain parts have been enlarged;

FIGS. 11(a) and 11(b) are used to illustrate the problems with the example arrangement of photodiodes shown in FIG. 9(a);

Figure 2:
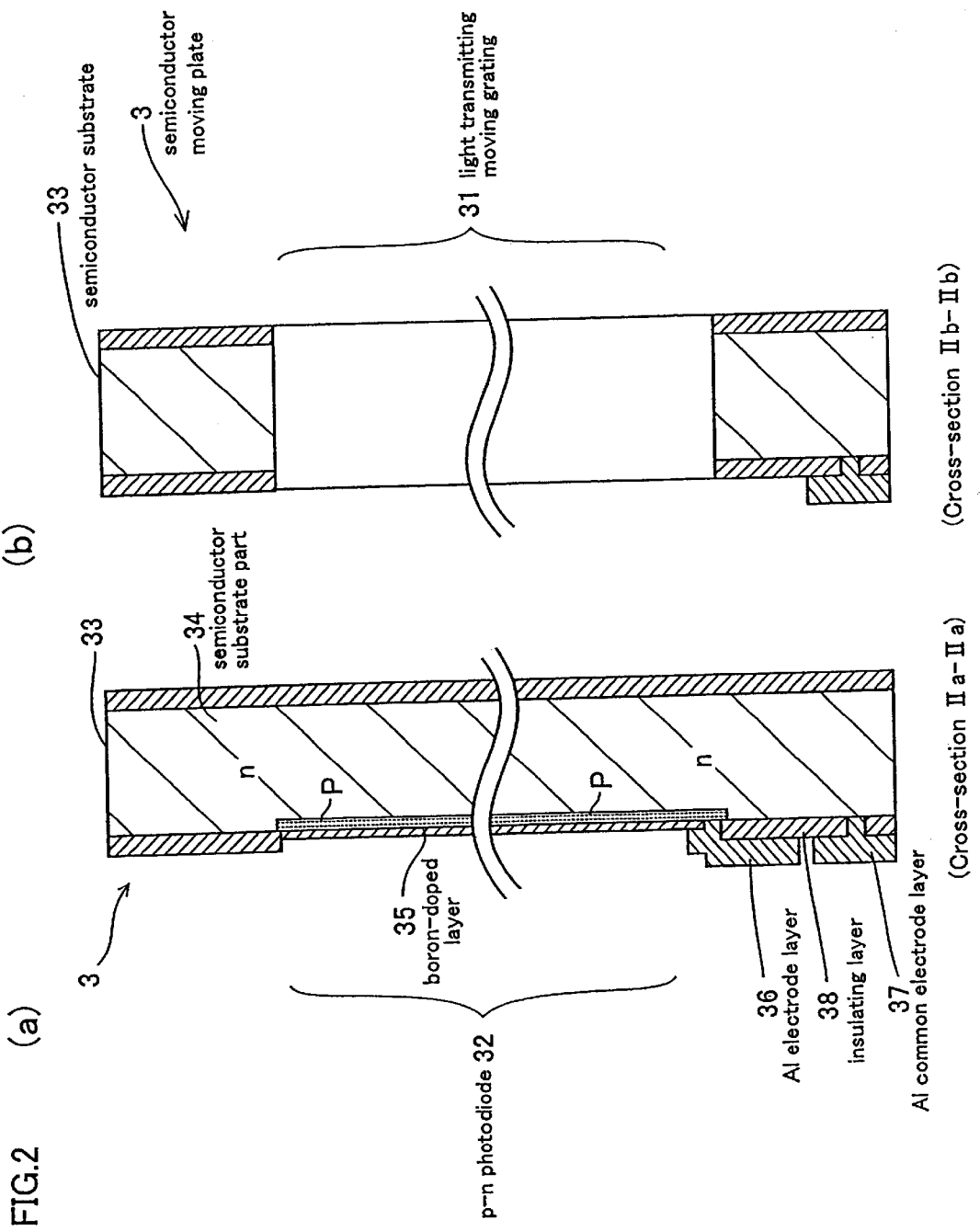
FIGS. 2(a) and 2(b) are simplified cross-sectional view of a photodiode and a part of a light transmitting grating that are formed on the semiconductor moving plate shown in FIG. 1.

Explanation of the Symbols
1 optical linear encoder
2 LED
3 semiconductor moving plate
10 semiconductor moving plate unit with integral light source
11 LED protective plate
12 semiconductor moving plate
13 concave
14, 15 planar LEDs
16 concave
17, 18 light transmitting moving gratings
19, 20 photodiodes
21 first region
22 second region
31 light transmitting moving grating
32 photodiodes
33 semiconductor substrate
34 semiconductor substrate part
35 boron-doped layer
36 electrode layer
37 common electrode layer
38 silicon oxide layer (insulating layer)
4 reflective grating plate
41 reflective grating
5 control circuit
51 signal processing unit
52 calculation unit
53 display unit
54 lamp driving unit
310, 410 semiconductor substrate
320, 350, 420 light transmitting gratings
330, 350 split photodiodes
441, 442, 451, 452, 471, 472, 481, 482 photodiodes
340, 370 region, in which light transmitting gratings and photodiodes are alternately arranged
440, 450 region, in which photodiodes are arranged at fixed intervals
430 region, in which a light transmitting grating are alternately arranged at fixed intervals

DESCRIPTION OF THE PREFERRED EMBODIMENTS

The following describes, with reference to the attached drawings, an optical linear encoder that is an embodiment of the present invention.

FIGS. 1(a) to 1(c) are simplified representations of the optical linear encoder of the present embodiment. As shown in these drawings, a optical linear encoder 1 of the present embodiment is fundamentally composed of an LED 2 that serves as a light source, a semiconductor moving plate 3 on which a moving grating and photodetectors are formed, a static grating plate 4 that is reflective, and a control circuit 5. As described later in this specification, a light transmitting grating 31 in the form of vertical stripes with a fixed width and a fixed pitch and photodiodes 32 which serve as the photodetectors (and are shown as the hatched parts in FIG. 1(c)) are alternately formed in the planar direction on the semiconductor moving plate 3. In the same way, a reflective grating 41 in the form of vertical stripes with a fixed width and a fixed pitch is arranged in the planar direction on a surface 4a on a light receiving side of the static grating plate 4.

The control circuit 5 includes a signal processing unit 51 that forms, based on detection signals outputted by the photodiodes 32, an A-phase signal and a B-phase signal that have a phase difference of one-quarter wavelength, a calculation unit 52 that calculates movement information, such as the speed of movement and direction of movement of the semiconductor moving plate 3, based on the A-phase signal and the B-phase signal, a display unit 53 that displays a result of this calculation, and a lamp driving unit 54 that performs feedback control over the driving of the LED 2.

It should be obvious that the calculation unit 52, the display unit 53, and the lamp driving unit 54 may be provided outside the control circuit 5 and connected as peripheral circuits.

FIGS. 2(a) and 2(b) are cross-sectional views of the semiconductor moving plate 3 and respectively show a part where a light-transmitting slit is formed and a part where a photodiode is formed. The semiconductor moving plate 3 is formed of a semiconductor substrate 33, such as a silicon substrate. As can be understood from FIG. 2(b), a light transmitting grating 31 in the form of vertical stripes with a fixed width and a fixed pitch is formed on the semiconductor substrate 33 by an etching process.

As can be understood from FIG. 2(a), in the parts of the semiconductor substrate that remain between the light transmitting grating 31 on the semiconductor substrate 33, photodiodes 32 are formed as pn junctions composed of the remaining semiconductor substrate parts 34 and a boron-doped layer 35 that is formed by doping the surface of these remaining semiconductor substrate parts 34 with boron. It should be obvious, however, that the photodiodes 32 may be formed on of the semiconductor substrate 33 using a different method.

An electrode layer 36 made of aluminum is connected to the boron-doped layer 35 of each photodiode 32, while a shared electrode layer 37 that is also made of aluminum is connected to the semiconductor substrate 33. It should be obvious that these electrodes may be made from another conductive material instead of aluminum.

The electrode layer 36 and semiconductor substrate 33 are insulated from one another by an insulating layer 38 that is made up of a silicon oxide layer. The exposed surface of the semiconductor substrate 33 is also covered with a silicon oxide layer to make the semiconductor substrate 33 more durable. In the same way, the surface of the boron-doped layer 35 is also covered with a silicon oxide layer.

In an optical linear encoder 1 of the present embodiment that has the above construction, the semiconductor moving plate 3 is integrally provided with a body whose movement is to be measured (not shown in the drawings). When the semiconductor moving plate 3 moves perpendicular to an optical axis L in a direction in which the slits and photodiodes are arranged, the light emitted by the LED 2 becomes incident on the back of the semiconductor moving plate 3 and passes through the light transmitting grating 31 formed in the semiconductor moving plate 3 to become incident on the static grating plate 4 in the form of the slits of the grating.

Since a light reflective grating 41 in the form of stripes of a fixed width and a fixed pitch is formed on the static grating plate 4, only the light that is incident on the light reflecting grating 41, out of the light that is incident on the static grating plate 4, is reflected. An image of this light reflecting grating 41 is formed on the semiconductor moving plate 3 where the light is detected by the photodiodes 32 that are also in the form of stripes of a fixed width and a fixed pitch.

In this way, in the present embodiment, the light transmitting grating 31 and the photodiodes 32 that are formed as vertical stripes on the semiconductor moving plate 3 function as two grating plates. Based on the triple-grating theory where a reflective grating is used, the amount of light that corresponds to the relative movement of the light reflecting grating 41 and the moving gratings (31 and 32) is converted to the form of a sine wave in the photodiodes 32. As a result, a pulsed signal corresponding to the relative speed of movement can be obtained based on the optical current produced by the photodiodes 32, with it being possible to calculate the relative speed of movement based on the pulse rate of this pulsed signal.

Also, as shown in FIG. 1(a), it is possible to generate an A-phase signal based on the total output of the odd-numbered photodiodes and a B-phase signal, whose phase is shifted by one-quarter wavelength, based on the total output of the even-numbered photodiodes. Based on these two signals of different phase, the direction in which the moving gratings are moving can be detected.

As described above, in the optical linear encoder 1 of the present embodiment, the moving gratings and photodetectors are produced using semiconductor manufacturing techniques, so that gratings can be manufactured with a minute pitch. This makes it possible to produce an encoder with high resolving power.

Since photodetectors, which are in the form of vertical stripes of a fixed pitch, function as a grating that also has a lens effect, there is no need to use a lens optical system. This means that the apparatus can be made smaller.

Also, according to the triple-grating theory, the width of the gap between the reflective grating and the moving gratings and the fluctuation in this gap do not adversely affect the resolving power of the apparatus. As a result, it is possible to simplify the adjustment performed to confirm that the members forming these parts have been attached with suitable precision. There are also fewer restrictions on the positions where the parts can be arranged.

Another benefit is that since the gap between the reflective grating and the moving gratings can be increased, the reflective grating, for example, can be provided with a protective case to make the apparatus more durable.

(Semiconductor Moving Plate Unit with Integral Light Source)

The following describes an example of a semiconductor moving plate unit with an integral light source that can be used as the optical linear encoder 1 described above.

Figure 4:
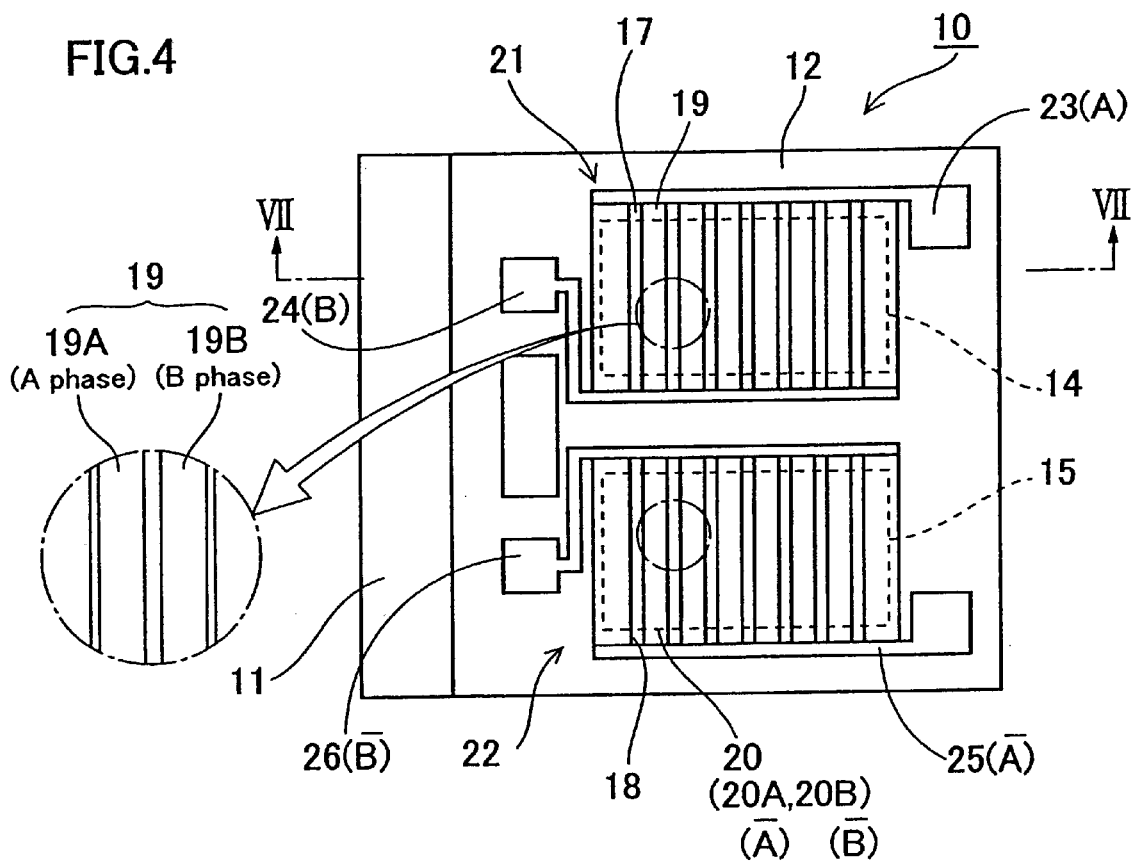
FIG. 4 is an overhead view showing a semiconductor moving plate with an integral light source that is used in an optical encoder of the present invention.
Figure 5:
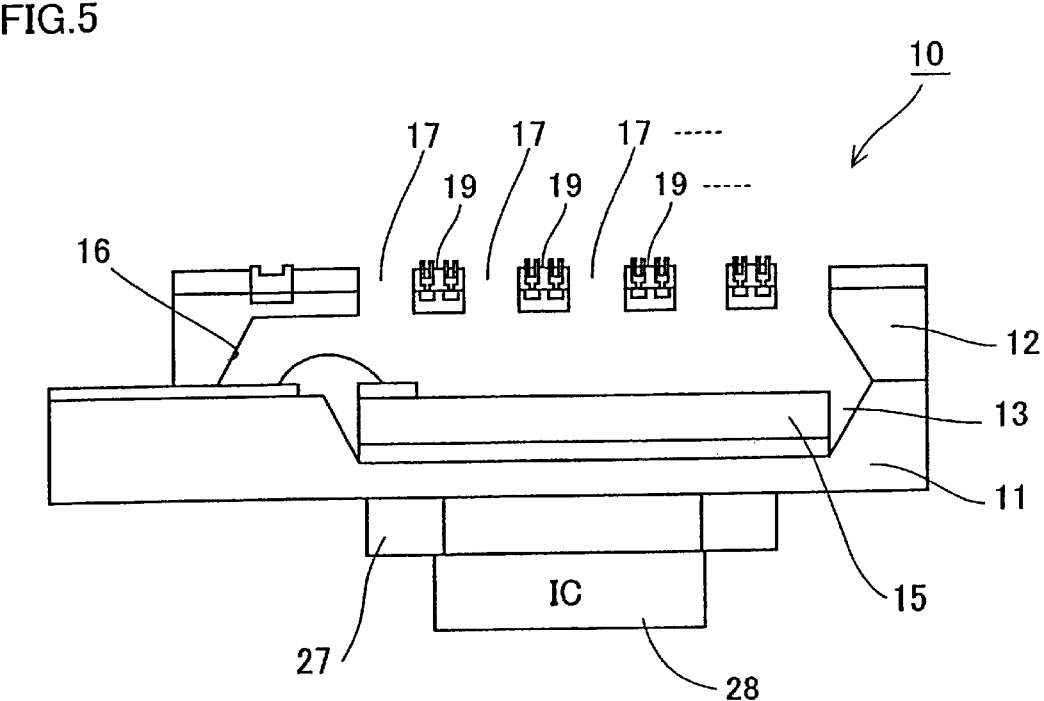
FIG. 5 is a cross-sectional view of the semiconductor moving plate in FIG. 4 taken along the line VII—VII.
Figure 7:
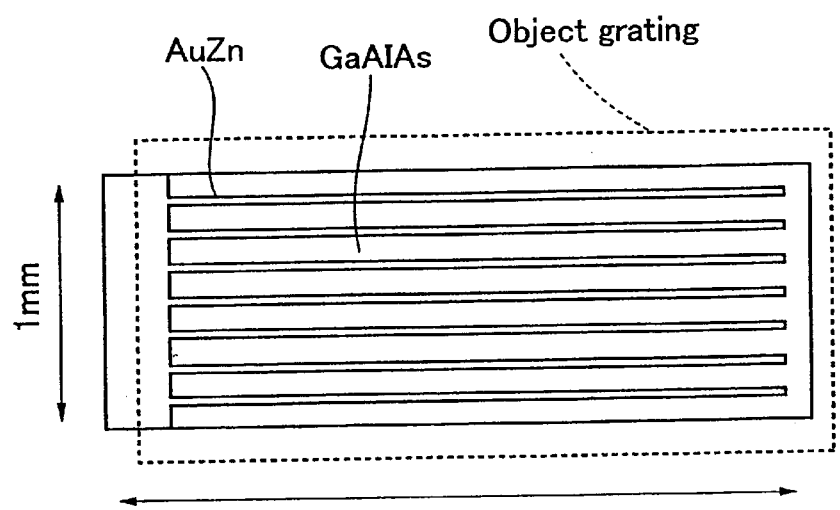
FIG. 7 is an overhead view of the planar LED shown in FIG. 4.
Figure 6:
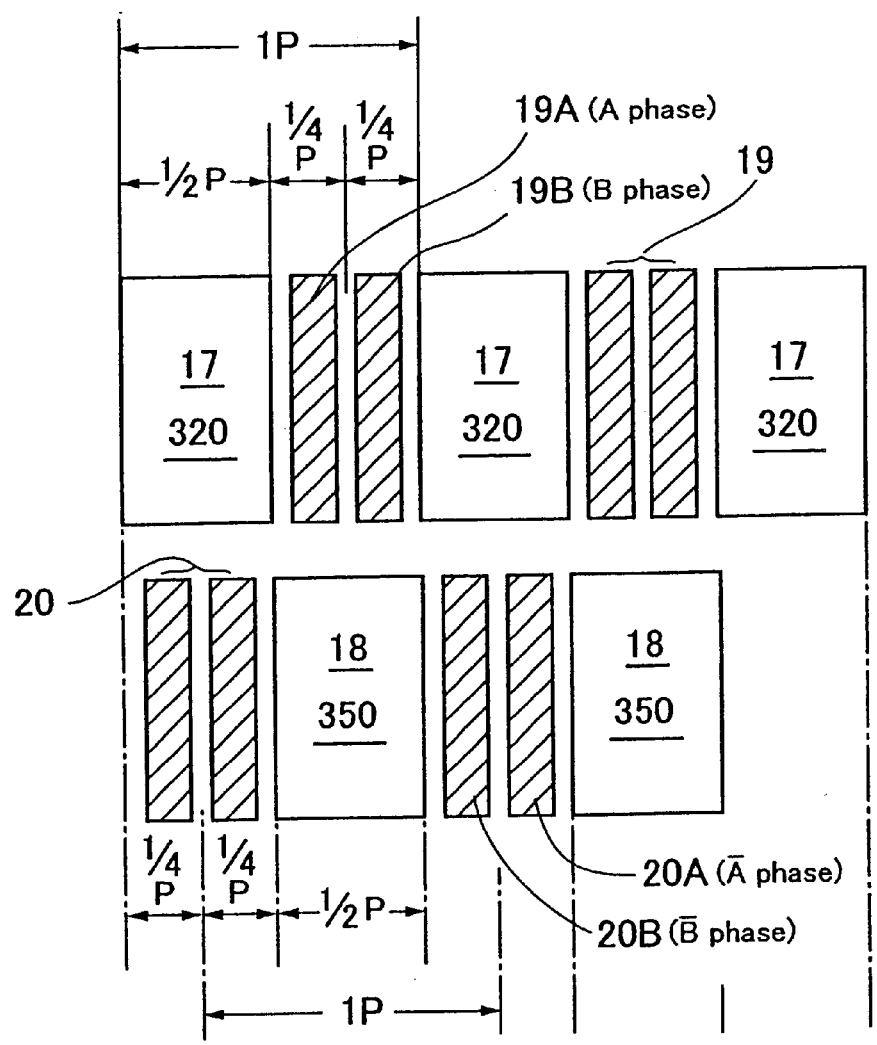
FIG. 6 shows the positional relationship between the photodetectors formed on the semiconductor moving plate shown in FIG. 4.

FIGS. 4 and 5 are respectively an overhead view and a side elevation of a semiconductor moving plate unit with an integral light source according to the present embodiment. FIG. 6 shows the positional relationship of the photodetectors formed on this semiconductor moving plate, while FIG. 7 is an overhead view showing a planar LED that is used as the light source.

As can be seen in these drawings, the semiconductor moving plate unit with integral light source 10 of the present embodiment is equipped with an LED protective plate 11 composed of a silicon substrate and a semiconductor moving plate 12 that is stacked on the surface of this LED protective plate 11. A concave 13 with a predetermined depth is formed in the surface of the LED protective plate 11, in which two planar LEDs 14 and 15 are attached. As shown in FIG. 7, these planar LEDs 14 and 15 are composed of a GaAlAs light-emitting layer that is formed on an AuZn substrate.

The semiconductor moving plate 12 is also formed of a silicon substrate and has a large concave 16 formed in its rear surface so as to accommodate the concave 13 formed in the LED protective plate 11. A first region 21 and a second region 22, in which light transmitting gratings 17 and 18 and photodiodes 19 and 20 are formed in alternating positions, are produced in the thin plate that forms the base part of this concave 16. The planar LEDs 14 and 15 are arranged on the LED protective plate 11 so as to face this first region 21 and the second region 22.

The photodiodes 19 in the first region 21 are split photodiodes, with one side being a first partial photodiode 19A for obtaining an A-phase detection signal and the other side being a second partial photodiode 19B for obtaining a B-phase detection signal. In the same way, the photodiodes 20 in the second region 22 are split photodiodes, with the respective sides forming the first and second partial photodiodes 20A and 20B.

The partial photodiodes 19A and 19B of the first region 21 and the partial photodiodes 20A and 20B of the second region 22 are arranged at positions that are shifted by one half of one pitch. As a result, the partial photodiodes 20A and 20B of the second region 22 produce an inverse A-phase signal and an inverse B-phase signal. FIG. 6 shows this positional relationship between the split photodiodes.

Next, an electrode wiring layer 23 that is connected to each of the partial photodiodes 19A that produce an A-phase signal, an electrode wiring layer 24 that is connected to each of the partial photodiodes 19B that produce a B-phase signal, an electrode wiring layer 25 that is connected to each of the partial photodiodes 20A that produce an inverse A-phase signal, and an electrode wiring layer 26 that is connected to each of the partial photodiodes 20B that produce an inverse B-phase signal are formed on the surface of the semiconductor moving plate 12.

Also, as shown in FIG. 5, an IC chip 28 is mounted, via a spacer 27 made of silicon, on the rear surface of the LED protective plate 11. Circuits, such as a driver circuit for the planar LEDs and a signal processing circuit for processing the detection signals of the photodetectors, are integrated in this IC chip 28.

(Example Arrangements of the Photodetectors and the Light-Transmitting Grating)

FIGS. 8(a) to 8(d) show other example arrangements of the light-transmitting grating and photodetectors formed as vertical stripes on the semiconductor moving plate 12. In each case, the light-transmitting grating and photodetectors are arranged in alternating positions.

In the example shown in FIG. 8(a), four regions 301 to 304, in which a light-transmitting grating in the form of vertical stripes and photodiodes in the form of vertical stripes are alternately formed, are provided on the semiconductor substrate 3A. In this example, an A-phase signal is obtained from the group of photodiodes in the region 301 and a B-phase signal is obtained from a group of photodiodes that are positioned in the region 302 so that the phase of the detection signal is shifted by 90° with respect to the detection signal obtained from the group of the photodiodes in the region 301.

The group of photodiodes in the region 303 that is positioned below the region 301 is arranged so the phase of the detection signal produced by these photodiodes is shifted by 180° with respect to the detection signal obtained from the group of the photodiodes in the region 301. Consequently, an inverse A-phase signal is obtained from the group of photodiodes in the region 303. In the same way, the group of photodiodes in the region 304 that is positioned to the side of the region 303 is arranged so that an inverse B-phase signal is obtained.

In the example shown in FIG. 8(b), four parallel rectangular regions 401 to 404 are formed on a semiconductor substrate 3B in a direction that is perpendicular to the direction in which the semiconductor substrate 3B moves. In the top region 401, a light transmitting grating in the form of vertical stripes with a fixed pitch and photodiodes in the form of vertical stripes are formed parallel to the direction in which the semiconductor substrate 3B moves. The region 402 is positioned with respect to the region 401 so that the phase of the detection signal produced by the photodiodes is shifted by 90° with respect to the signal produced by the photodiodes in the region 401. The region 403 that is below the region 402 is positioned with respect to the region 401 so that the phase of the detection signal produced by the photodiodes is shifted by 180° with respect to the signal produced by the photodiodes in the region 401. Also, the region 404 is positioned with respect to the region 402 so that the phase of the detection signal produced by the photodiodes is shifted by 180° with respect to the signal produced by the photodiodes in the region 402.

As a result, if an A-phase signal is obtained from the photodiodes in the region 401, for example, a B-phase signal is obtained from the photodiodes in the region 402, an inverse A-phase signal is obtained from the photodiodes in the region 403, and an inverse B-phase signal is obtained from the photodiodes in the region 404.

In the example shown in FIGS. 8(c) and 8(d), a plurality of regions are arranged at equal intervals on a semiconductor substrate 3C parallel to the direction of movement (the horizontal direction) of the substrate. In the drawings, three regions 501 to 503 are shown. In each region, a light-transmitting grating 31C (shown using diagonal shading in FIG. 8(d)) in the form of vertical stripes and photodiodes 32C in the form of vertical stripes that are formed between openings in the light-transmitting grating 31C are formed in alternating positions with a fixed pitch.

If the distance between the regions 501 and 502 and between the regions 502 and 503 are assumed to be one pitch, the width of each region is one half of one pitch, with four photodiodes 32C being formed in this width, as shown in FIG. 8(d). Each photodiode 32C is one sixteenth of one pitch wide and the distance between adjacent photodiodes is one eighth of one pitch. Gaps of one thirty-secondth of one pitch are left between the outermost photodiodes and the edges of the region, though these gaps are not restricted to being one thirty-secondth of one pitch. Also, the ratios of the widths of the light-transmitting grating and light-transmitting parts to the widths of the photodiodes are not restricted to 1:1.

When this arrangement is used, as one example an A-phase signal can be obtained from the photodiodes on the leftmost side of each region, a B-phase signal can be obtained from the photodiodes to the right of these photodiodes in each region, an inverse-A phase signal can be obtained from the next photodiodes to the right in each region, and an inverse-B phase signal can be obtained from the rightmost photodiodes in each region.

FIGS. 9(a) to 9(c) and FIG. 10 show example arrangements where regions in which photodiodes are arranged at fixed intervals and regions in which the slits in a light-transmitting grating are separately formed on the surface of a semiconductor substrate.

As shown in these drawings, a region 430, in which a light transmitting grating 420 with slits that run parallel to the direction in which the semiconductor substrate moves formed at fixed intervals, is formed in the center of a surface of the semiconductor substrate 410. Regions 440 and 450, in which photodiodes are arranged at fixed intervals, are formed on the surface of the semiconductor substrate 410 on both sides of this light transmitting grating 420 in a symmetrical fashion.

Figure 10:
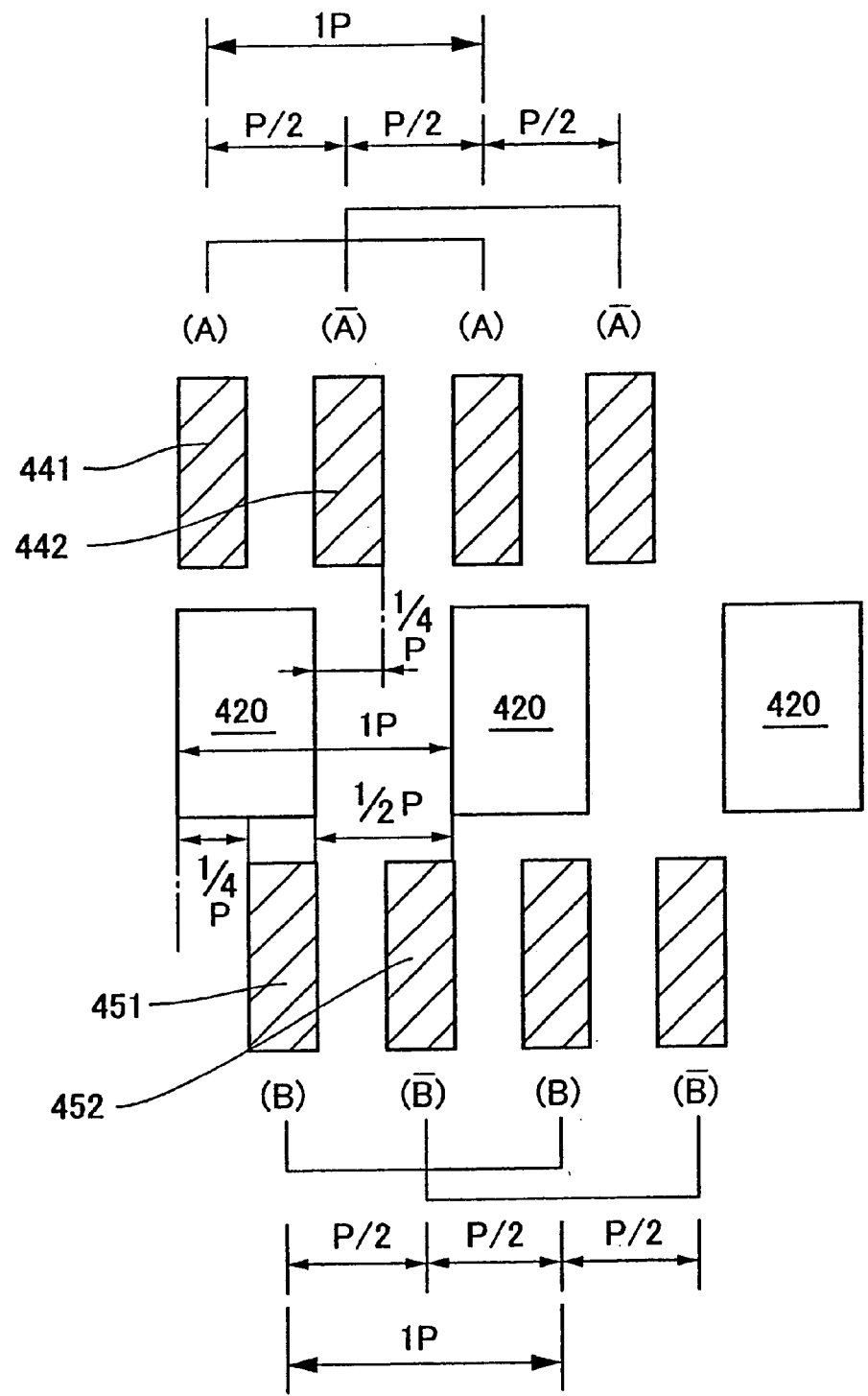
FIG. 10 is a representation of an example arrangement of the photodiodes shown in FIG. 9(a)

The photodiodes 441 at odd-numbered positions in the region 440 and the photodiodes 442 at even-numbered positions in the region 440 are arranged at intervals so that the there is a phase difference of 180° between the detection signals produced by the two sets of photodiodes. The photodiodes 451 at odd-numbered positions in the region 450 and the photodiodes 452 at even-numbered positions in the region 450 are arranged at the same intervals, so that there is also a phase difference of 180° between the detection signals produced by these sets of photodiodes. The photodiodes 441 in the region 440 and the photodiodes 451 in the region 450 are shifted by one quarter of one pitch relative to each other. This means that if an A-phase signal is obtained from the photodiodes 441 in the region 440, an inverse-A phase signal is obtained from the photodiodes 442 in the same region 440. Furthermore, a B-phase signal is obtained from the photodiodes 451 in the region 450 and an inverse B-phase signal is obtained from the photodiodes 452. One example arrangement of these photodiodes is shown in FIG. 10.

It should be noted that in this example also, an electrode wiring layer 461 that is connected to each of the photodiodes 441 that produce an A-phase signal, an electrode wiring layer 462 that is connected to each of the photodiodes 451 that produce an inverse A-phase signal, an electrode wiring layer 463 that is connected to each of the photodiodes 442 that produce a B-phase signal, and an electrode wiring layer 464 that is connected to each of the photodiodes 452 that produce an inverse B-phase signal are formed on the surface of the semiconductor substrate 410.

Also, as shown in FIG. 9C, a semiconductor substrate 490, in which a concave 491 is formed, may be attached to the rear surface of the semiconductor substrate 410. A light source 492, such as a planar laser or LED, can be provided on the bottom surface of this concave 491. By using this construction, a compact detection mechanism with an integrally formed light source can be achieved.

When the semiconductor substrate 410 shown in FIGS. 9(a) to 9(c) is used, it is necessary to precisely position the semiconductor substrate 410 relative to the static grating plate in which the reflective grating is formed. In other words, as shown in FIG. 11(a), if the semiconductor substrate 410 is positioned relative to the static grating plate 4A so as to be inclined in the directions shown by the arrows A and B in the drawing, the light transmitting grating 420 and the photodiodes 441, 442, 451, and 452 all end up being inclined relative to the static grating 4b of the static grating plate 4A. The inclined state of these components in the direction A is shown in FIG. 11(b).

Through experimentation, the inventors of the present technology found that when there is a minute inclination of around just 0.15°, a phase shift of around 45° is observed in the detection signals obtained from the photodetectors. As for when these components are inclined in the direction shown by the arrow B, a change in the angle of inclination of around 0.5° was found to result in a difference of output between the A phase signal and the B phase signal of around 0.2V (around 20% of the 1V base value of the output). As a result, once the semiconductor substrate 410 has been positioned relative to the static grating plate 4A, it is necessary to measure the actual detection signals and to adjust the signal levels.

In order to avoid fluctuations in the photodetector detection signals due to positional errors of the semiconductor substrate 410 relative to the static grating plate, it is preferable to use the following construction.

In the same way as in FIG. 9, a region 430, in which a light transmitting grating 420 with slits that run parallel to the direction in which the semiconductor substrate moves are formed at fixed intervals, is formed in the center of a surface of the semiconductor substrate 410. Regions 440 and 450, in which photodiodes are arranged at fixed intervals, are formed on the surface of the semiconductor substrate 410 on both sides of this light transmitting grating 420 in a symmetrical fashion. However, photodiodes that output detection signals with the following phase characteristics are arranged in the regions 440 and 450.

Figure 12:
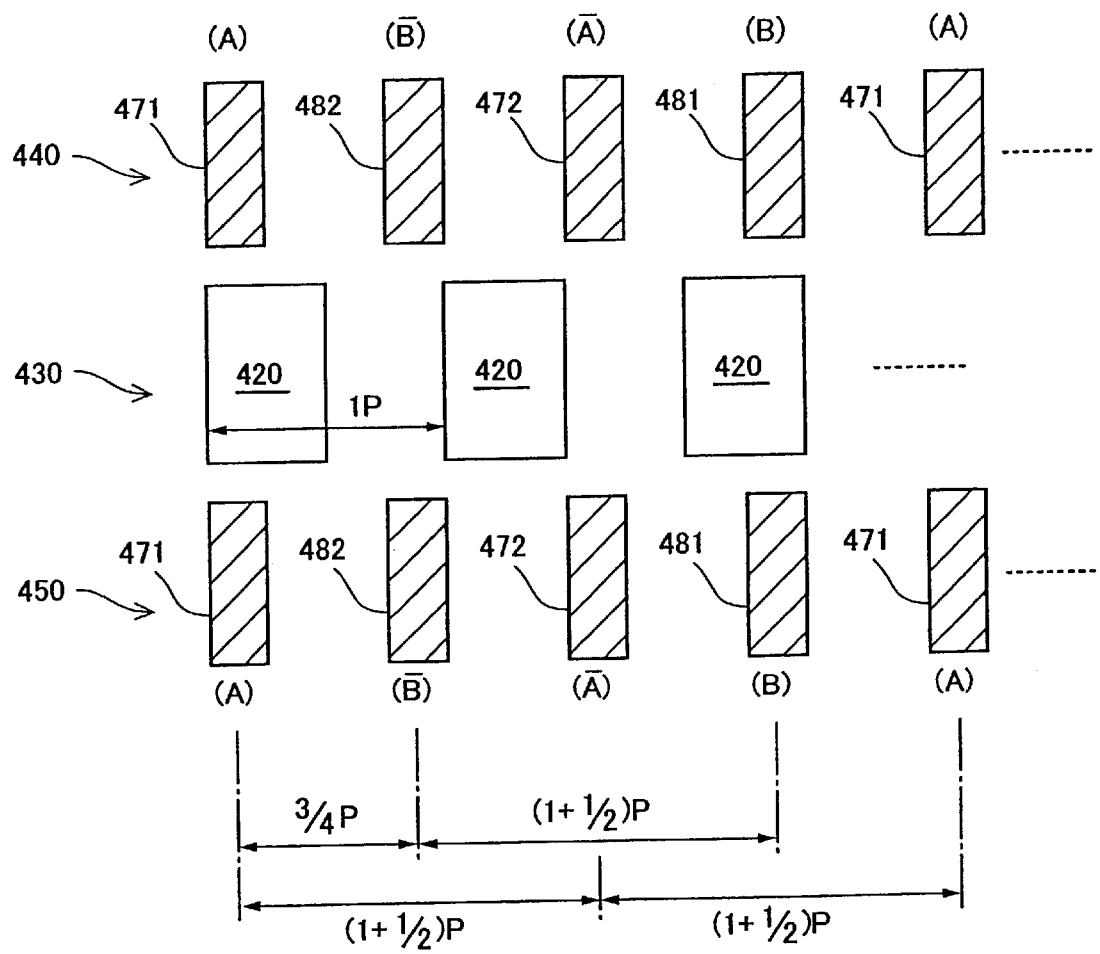
FIG. 12 is a representation of an example arrangement of the photodiodes that solves the problems that occur for the example arrangement of photodiodes shown in FIG. 9(a)

As shown in FIG. 12, photodiodes 471, 482, 472, and 481 are arranged at three quarters of one pitch intervals so that there is a phase difference of 270° between the detection signals produced by adjacent photodiodes. As a result, the photodiodes 471 and the photodiodes 472 are arranged one and one half pitches apart, so that if the detection signal obtained from one set of photodiodes is an A-phase signal, the detection signal obtained from the other set is an inverse A-phase signal. Furthermore, a B-phase signal that has a phase difference of 90° with respect to the A-phase signal obtained from the photodiodes 471 is obtained from the photodiodes 481. This means that an inverse B-phase signal is obtained from the remaining photodiodes 482. It should be noted that the same arrangement of photodetectors is used in the other region, the region 450.

When photodetectors are arranged with an equal pitch in the regions 440 and 450, which lie above and below the region 430 in which the light transmitting grating 420 is formed, so that an A-phase signal, an inverse A-phase signal, a B-phase signal, and an inverse B-phase signal are obtained, it was confirmed that fluctuations in the phase and voltages of the detection signals due to errors in the positioning of the static grating plate and semiconductor substrate can be suppressed. This means that when this construction is used, detection can be performed with high accuracy. Furthermore, since the photodetectors are widely spaced apart in this arrangement, there is the additional benefit that it is easier to insulate the photodetectors from one another.

(Improving the S/N Ratio)

In each of the examples described above, an A-phase signal with little error can be produced by obtaining a differential signal for the A-phase signal and inverse A-phase signal that have been obtained. In the same way, a B-phase signal with little error can be produced by obtaining a differential signal for the B-phase signal and inverse B-phase signal that have been obtained. By using these differential signals, the S/N ratio of the optical encoder can be improved.

The following describes the method used to improve the S/N ratio. Since light is shone onto the photodiodes that have been formed on the semiconductor moving plate described above from the rear side of the plate, there is the risk of an increase in the dark current and a decrease in the S/N ratio. By avoiding this problem, the S/N ratio can be improved. This can be achieved in the following manner.

Figure 13:
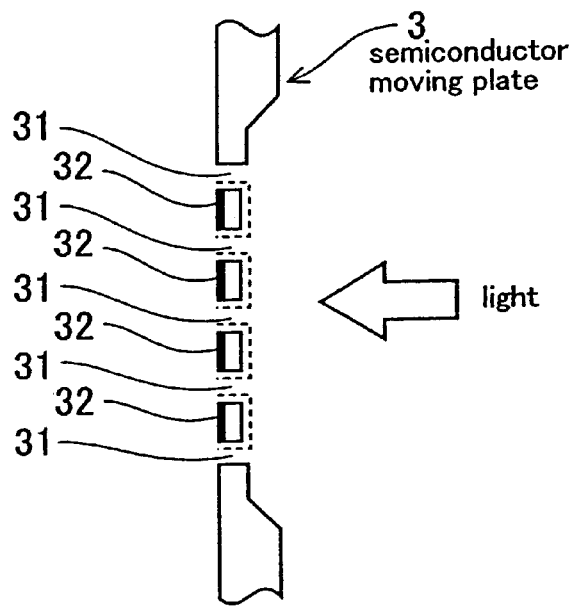
FIG. 13 shows a method for improving the S/N ratio of the photodetectors.

The following description refers to FIG. 13 and applies to the example of the semiconductor substrate 3 that is shown in FIGS. 1 and 2. A reflective film (shielding film) composed of a material such as aluminum or gold is formed using vapor deposition on the rear surface (which is to say, the light source side) of the semiconductor substrate 3. When doing so, it is more effective if the reflective film is also formed on the side surfaces of the photodiodes 32. In FIG. 13, the regions where a reflective film can be formed are shown using dotted lines.

(Forming the Light Transmitting Grating)

Next, dry etching can be performed on the surface of the semiconductor substrate in order to form a light transmitting grating in the semiconductor substrate. If dry etching is used, the surface of the substrate can be vertically etched. Alternatively, wet etching, which is a low-cost manufacturing method, may be used. In the latter case, the crystal orientation results in the etching being anisotropic, so that slits whose side surfaces are inclined with respect to the surface of the semiconductor substrate are formed, as shown in FIG. 14.

Figure 14:
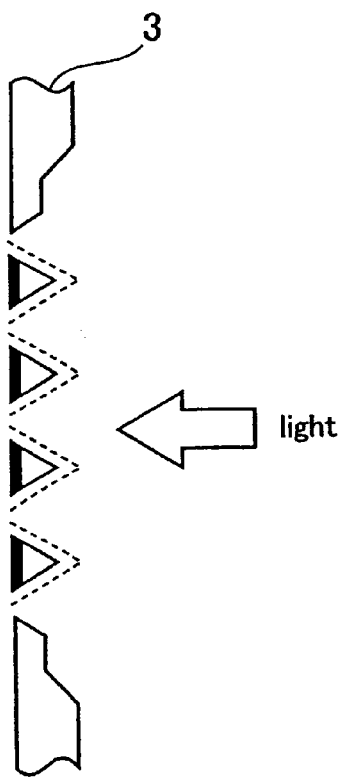
FIG. 14 shows the light transmitting parts of the photodetectors that are formed when wet etching is used.

In this case also, if a reflective film is formed, using vapor deposition or the like, on the rear surfaces (the light source side) of the parts left for the photodiodes, which is to say, in the parts shown by the dotted lines in FIG. 14, the dark currents of the photodiodes can be decreased, thereby improving the S/N ratio.

(Other Embodiments)

It should be noted that while the light transmitting moving grating of the semiconductor substrate in each of the above examples is composed of slits that are formed in the semiconductor substrate to allow light to pass, as one alternative a thin film that can allow enough to pass may be formed by etching the semiconductor substrate, with the etched parts forming the moving grating.

Figure 3:
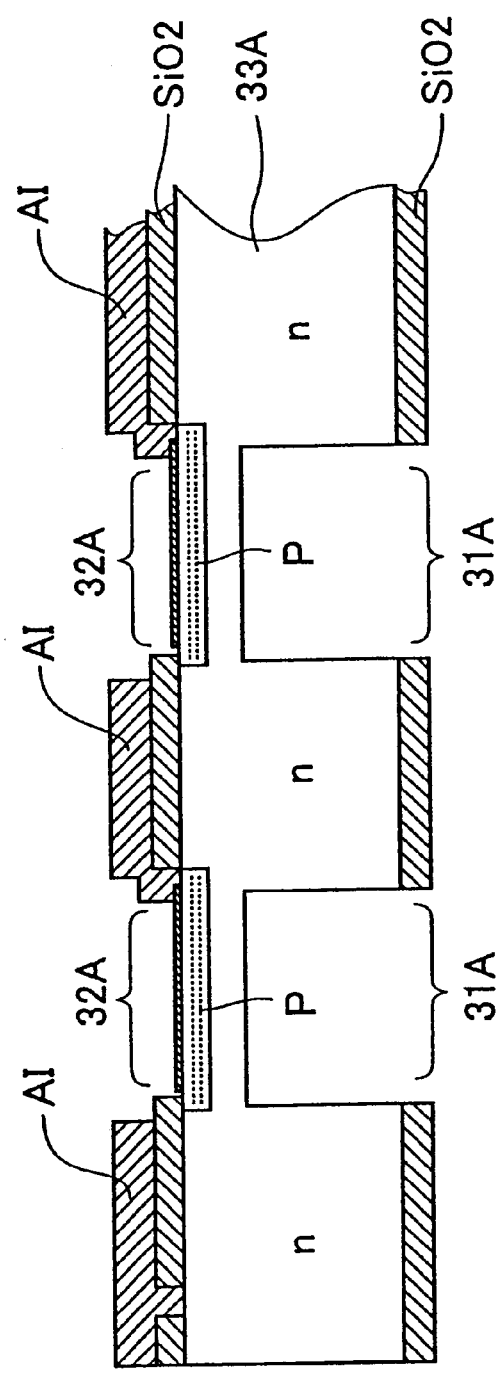
FIG. 3 is a cross-sectional view of another example of a semiconductor moving plate.

Also, as shown in FIG. 3, etching may be performed on parts of the rear side of the semiconductor substrate 33A on which the photodiodes 32A are formed so as to form thin film parts that allow enough light to pass. In this case, these etched thin film parts are used as the moving grating 31A.

On the other hand, while the plate in which the light reflecting grating 41 is formed is set as the static grating in the above examples, it is possible to use a construction where the plate with the light reflecting grating 41 is the moving plate and the semiconductor moving plate 3 is static.

Furthermore, while LEDs are used as the light source in the above examples, another kind of light source, such as a laser light source, may be used.

While the above examples relate to a linear encoder, the present invention can also be applied to a rotary encoder. In this case, the light transmitting parts and the photodiode parts may be formed at predetermined angles in a circumferential direction.

As described above, the optical encoder of the present invention has a construction that uses a reflective grating and a moving grating based on the triple-grating theory. An image of the reflecting grating, from which information relating to the relative movement of the gratings can be detected, is formed on photodetectors, with the moving grating and photodetectors being formed on the same semiconductor substrate.

Accordingly, with the encoder of the present invention, there is no need to separately arrange photodetectors to the rear of the moving grating, with it only being necessary to position a light source. Since the photodetectors that are arranged in the form of a grid on the semiconductor substrate act as a lens, it is possible to produce a spatial filter encoder without using a lens optical system. This means that a compact, small-scale apparatus can be produced.

Since the moving grating is formed in a semiconductor substrate, there is the advantage that a grating with minute pitch can be precisely formed using semiconductor manufacturing techniques.

Since the triple-grating theory is used, the contrast of the detection signal is unaffected by the width of the gap between the reflective grating and the moving grating and by fluctuations in this gap. This facilitates the manufacturing process that positions the components in which the reflective grating and the moving grating are formed, with a further advantage being an easing of the restrictions on the positions at which such components can be placed.

An optical encoder of the present invention has a construction where a reflective grating and a moving grating are used in accordance with the triple-grating theory, with an image of the reflective grating, from which information relating to the relative movement of the gratings can be detected, being formed on the photodetectors and the moving grating and photodetectors being formed on the same semiconductor substrate. Also, a planar LED is used as the light source, and the encoder has a stacked construction where this planar LED is integrally formed on the rear surface of the moving grating.

By using the optical encoder of the present invention, there is no need to arrange photodetectors to the rear of the moving grating as separate components and no need to provide a light source as a separate component. Since the photodetectors that are arranged in the form of a grid on the semiconductor substrate themselves act as a lens, it is possible to produce a spatial filter encoder without using a lens optical system. This means that a compact, small-scale apparatus can be produced.

Since the moving grating is formed in a semiconductor substrate, there is the advantage that a grating with minute pitch can be precisely formed using semiconductor manufacturing techniques.

Since the triple-grating theory is used, the contrast of the detection signal is unaffected by the width of the gap between the reflective grating and the moving grating and by fluctuations in this gap. This facilitates the manufacturing process that positions the components in which the reflective grating and the moving grating are formed, with a further advantage being an easing of the restrictions on the positions at which such components can be placed.

Furthermore, since a planar LED is used as the light source, there is no need to align the optical axis like when a point light source is used. Also, even when light source is positioned close to the moving grating, problems such as a reduction in the effective light receiving area of the photodetectors can be avoided, thereby ensuring that enough light is received. This means that highly precise detection can be expected.

What is claimed is:

1. An optical encoder, including a light source, a reflective grating of a predetermined form and a fixed pitch, a light transmitting grating of a predetermined form and a fixed pitch, and photodetectors with light receiving surfaces of predetermined form and a predetermined pitch that receive a reflected image produced by light from the light source that has passed through the light transmitting grating and been reflected by the reflective grating, the optical encoder detecting at least a speed of relative movement of the reflective grating and the light transmitting grating, based on detection signals produced by the photodetectors, the optical encoder comprising:
a reflective grating plate in which the reflective grating is formed; and
a semiconductor substrate in which the light transmitting grating and the photodetectors are formed, the light transmitting grating being one of slits for transmitting light that are formed in the semiconductor substrate and thin-film parts for transmitting light that are formed in the semiconductor substrate,
a first region, in which the photodetectors and parts of the light transmitting grating are alternately arranged, and a second region, in which the photodetectors and parts of the light transmitting grating are alternately arranged, being formed in the semiconductor substrate, and
a detection signal obtained from the photodetectors in the first region having a phase difference of 90° with a detection signal obtained from the photodetectors in the second region.

2. An optical encoder according to claim 1,
wherein a third region, in which the photodetectors and parts of the light transmitting grating are alternately arranged, and a fourth region, in which the photodetectors and parts of the light transmitting grating are alternately arranged, are also formed in the semiconductor substrate,
a detection signal obtained from the photodetectors in the third region has a phase difference of 180° with a detection signal obtained from the photodetectors in the first region, and
a detection signal obtained from the photodetectors in the fourth region has a phase difference of 180° with a detection signal obtained from the photodetectors in the second region.

3. An optical encoder, including a light source, a reflective grating of a predetermined form and a fixed pitch, a light transmitting grating of a predetermined form and a fixed pitch, and photodetectors with light receiving surfaces of predetermined form and a predetermined pitch that receive a reflected image produced by light from the light source that has passed through the light transmitting grating and been reflected by the reflective grating, the optical encoder detecting at least a speed of relative movement of the reflective grating and the light transmitting grating, based on detection signals produced by the photodetectors, the optical encoder comprising:
a reflective grating plate in which the reflective grating is formed; and
a semiconductor substrate in which the light transmitting grating and the photodetectors are formed with parts of the light transmitting grating and the photodetectors in alternating positions,
the light transmitting grating being one of slits for transmitting light that are formed in the semiconductor substrate and thin-film parts for transmitting light that are formed in the semiconductor substrate, and
a detection signal obtained from a first group of photodetectors, out of the photodetectors formed in the semiconductor substrate, having a phase difference of 90° with a detection signal obtained from a second group of photodetectors, out of the photodetectors formed in the semiconductor substrate.

4. An optical encoder according to claim 3,
wherein a first region, in which the photodetectors and parts of the light transmitting grating are alternately arranged at fixed intervals, and a second region, in which the photodetectors and parts of the light transmitting grating are alternately arranged at the same fixed intervals as in the first region, are formed in the semiconductor substrate,
a detection signal obtained from photodetectors that are in the first group of photodetectors and are located in the first region has a phase difference of 180° with a detection signal obtained from photodetectors that are in the first group of photodetectors and are located in the second region, and a detection signal obtained from photodetectors that are in the second group of photodetectors and are located in the first region has a phase difference of 180° with a detection signal obtained from photodetectors that are in the second group of photodetectors and are located in the second region.

5. An optical encoder, including a light source, a reflective grating of a predetermined form and a fixed pitch, a light transmitting grating of a predetermined form and a fixed pitch, and photodetectors with light receiving surfaces of predetermined form and a predetermined pitch that receive a reflected image produced by light from the light source that has passed through the light transmitting grating and been reflected by the reflective grating, the optical encoder detecting at least a speed of relative movement of the reflective grating and the light transmitting grating, based on detection signals produced by the photodetectors, the optical encoder comprising:
a reflective grating plate in which the reflective grating is formed; and
a semiconductor substrate in which the light transmitting grating and the photodetectors are formed,
the light transmitting grating being one of slits for transmitting light that are formed in the semiconductor substrate and thin-film parts for transmitting light that are formed in the semiconductor substrate,
a first region, in which the photodetectors arranged at predetermined intervals, and a second region, in which parts of the light transmitting grating are arranged at predetermined intervals, being formed in the semiconductor substrate, and
a detection signal obtained from a first group of photodetectors that are located at odd-numbered positions in the first region having a phase difference of 180° with a detection signal obtained from a second group of photodetectors that are located at even-numbered positions in the first region.

6. An optical encoder according to claim 5,
wherein a third region in which the photodetectors arranged at predetermined intervals is formed in the semiconductor substrate,
a detection signal obtained from a third group of photodetectors that are located at odd-numbered positions in the third region has a phase difference of 180° with a detection signal obtained from a fourth group of photodetectors that are located at even-numbered positions in the third region, and
the detection signal obtained from a first group of photodetectors has a phase difference of 90° with a detection signal obtained from the third group of photodetectors.

7. An optical encoder, including a light source, a reflective grating of a predetermined form and a fixed pitch, a light transmitting grating of a predetermined form and a fixed pitch, and photodetectors with light receiving surfaces of predetermined form and a predetermined pitch that receive a reflected image produced by light from the light source that has passed through the light transmitting grating and been reflected by the reflective grating, the optical encoder detecting at least a speed of relative movement of the reflective grating and the light transmitting grating, based on detection signals produced by the photodetectors, the optical encoder comprising:
a reflective grating plate in which the reflective grating is formed; and
a semiconductor substrate in which the light transmitting grating and the photodetectors are formed,
the light transmitting grating being one of slits for transmitting light that are formed in the semiconductor substrate and thin-film parts for transmitting light that are formed in the semiconductor substrate,
a first region, in which the photodetectors are arranged at predetermined intervals, a second region, in which the photodetectors are arranged at predetermined intervals, and a third region, in which parts of the light transmitting grating are arranged at predetermined intervals, being formed in the semiconductor substrate, and
detection signals obtained from adjacent photodetectors in the first region and the second region having a phase difference of 270°.

8. An optical encoder according to claim 2, further comprising a signal processing circuit for generating a differential signal from the detection signals that have a phase difference of 180°.

9. An optical encoder according to claim 1, further comprising at least one planar light emitting diode (LED) as the light source.

10. An optical encoder according to claim 1, further comprising at least a first planar LED and a second planar LED as the light source, the first planar LED facing the first region and the second planar LED facing the second region.

11. An optical encoder, including a light source, a reflective grating of a predetermined form and a fixed pitch, a light transmitting grating of a predetermined form and a fixed pitch, and photodetectors with light receiving surfaces of predetermined form and a predetermined pitch that receive a reflected image produced by light from the light source that has passed through the light transmitting grating and been reflected by the reflective grating, the optical encoder detecting at least a speed of relative movement of the reflective grating and the light transmitting grating, based on detection signals produced by the photodetectors, the optical encoder comprising:
at least one planar LED as a light source;
a reflective grating plate in which the reflective grating is formed; and
a semiconductor substrate in which the light transmitting grating and the photodetectors are formed,
the light transmitting grating being one of slits for transmitting light that are formed in the semiconductor substrate and thin-film parts for transmitting light that are formed in the semiconductor substrate.

12. An optical encoder according to claim 11,
further comprising a support substrate for supporting the at least one planar LED,
wherein at least one concave is formed in the support substrate, the at least one planar LED being attached to the at least one concave, and the semiconductor substrate is attached to a surface of the support substrate.

13. An optical encoder according to claim 11, the at least one planar LED is composed of a plurality of planar LEDs.

14. An optical encoder according to claim 4, further comprising a signal processing circuit for generating a differential signal from the detection signals that have a phase difference of 180°.

15. An optical encoder according to claim 6, further comprising a signal processing circuit for generating a differential signal from the detection signals that have a phase difference of 180°.

16. An optical encoder according to claim 7, further comprising a signal processing circuit for generating a differential signal from the detection signals that have a phase difference of 180°.

17. An optical encoder according to claim 3, further comprising at least one planar light emitting diode (LED) as the light source.

18. An optical encoder according to claim 5, further comprising at least one planar light emitting diode (LED) as the light source.

19. An optical encoder according to claim 7, further comprising at least one planar light emitting diode (LED) as the light source.

20. An optical encoder according to claim 11, further comprising at least one planar light emitting diode (LED) as the light source.

21. An optical encoder according to claim 4, further comprising at least a first planar LED and a second planar LED as the light source, the first planar LED facing the first region and the second planar LED facing the second region.

22. An optical encoder according to claim 5, further comprising at least a first planar LED and a second planar LED as the light source, the first planar LED facing the first region and the second planar LED facing the second region.

23. An optical encoder according to claim 7, further comprising at least a first planar LED and a second planar LED as the light source, the first planar LED facing the first region and the second planar LED facing the second region.

* * * * *